US006313059B1

(12) United States Patent
Lavin et al.

(10) Patent No.: US 6,313,059 B1
(45) Date of Patent: Nov. 6, 2001

(54) DESICCANT FOR DRYING $CH_2F_2$ REFRIGERANT UTILIZING ZEOLITE

(76) Inventors: Maryellen Lavin, 54 Garden View Ter., Apt. 3, Hightstown, NJ (US) 08520-4612; Alan P. Cohen, 25 E. Algonguin Rd., P.O. Box 5017, Des Plaines, IL (US) 60017-5017; Jack E. Hurst, UOP GmbH Bayerwerk Building R 23, D-51368 Leverkusen (DE)

( * ) Notice: Subject to any disclaimer, the term of this patent is extended or adjusted under 35 U.S.C. 154(b) by 72 days.

(21) Appl. No.: 09/676,278

(22) Filed: Sep. 28, 2000

Related U.S. Application Data (60) Division of application No. 09/376,684, filed on Aug. 18, 1999, now Pat. No. 6,168,720, which is a continuation-in-part of application No. 08/879,448, filed on Jun. 20, 1997, now Pat. No. 6,020,281.

(51) Int. Cl.[7] ....................................................... B01J 29/06
(52) U.S. Cl. ................................ 502/68; 502/60; 502/63; 502/64; 502/85
(58) Field of Search ................................ 502/60, 63, 64, 502/68, 85

(56) References Cited

U.S. PATENT DOCUMENTS

| | | | |
|---|---|---|---|
| 3,224,167 | 12/1965 | Jones | 55/35 |
| 3,446,645 | 5/1969 | Drost | 117/26 |
| 3,506,593 | 4/1970 | Allenbach et al. | 252/455 |
| 3,536,521 | 10/1970 | McKinney et al. | 117/98 |
| 3,625,866 | 12/1971 | Conde | 252/455 Z |
| 4,604,372 | 8/1986 | Morishita et al. | 502/62 |
| 5,045,295 | 9/1991 | Tannous et al. | 423/328 |
| 5,198,139 | 3/1993 | Bierschenk et al. | 252/68 |
| 5,347,822 | 9/1994 | Lavin et al. | 62/85 |
| 5,514,633 | 5/1996 | Noguchi et al. | 502/64 |
| 5,879,581 | 3/1999 | Ushimaru | 252/68 |
| 6,020,281 | 2/2000 | Lavin et al. | 502/68 |

FOREIGN PATENT DOCUMENTS 6-327968 * 11/1994 (JP).

OTHER PUBLICATIONS

Donald W. Breck, *Zeolite Molecular Sieves*, published by Robert E. Krieger Publishing Company, Malabar, Florida No date available.

Paper "Inorganic Fluoride Uptake as a Measure of Relative Compatibility of Molecular Sieve Desiccants with Fluorocarbon Refrigerants" by Alan P. Cohen and C. Scott Blackwell published in *American Heating, Refrigeration, and Air Conditioning Engineers*, vol. 101, pp. 1–7, and presented on Jun. 26, 1995 at the Annual ASHRAE Conference in San Diego, CA.

* cited by examiner

*Primary Examiner*—Tom Dunn (57) ABSTRACT

Difluoromethane (R-32) is of current interest as a partial replacement for chlorodifluoromethane (R-22) refrigerant heretofore widely used in vapor compression refrigeration systems. R-32 has, however, proved to be more reactive than is desirable with the zeolite A adsorbent-desiccant compositions used in such systems to prevent corrosion and freeze-up problems. The potassium cation form of a zeolite A molecular sieve—with at least 60 percent of the sodium cations replaced with potassium ions, agglomerated with a clay binder, and pore-reduced to essentially exclude the adsorption of R-32 having essentially no reactivity with difluoromethane, and having a surface ratio of silicon to aluminum of less than about 1.7 mol/mol as determined by X-ray photoelectron spectroscopy—has been found to be an effective desiccant for refrigerants comprising difluoromethane.

4 Claims, 4 Drawing Sheets

Fig. 2
WATER ADSORPTION

Fig. 3
R-32 ADSORPTION

Fig. 4
WATER ADSORPTION

DESICCANT FOR DRYING CH$_2$F$_2$ REFRIGERANT UTILIZING ZEOLITE

CROSS-REFERENCE TO RELATED APPLICATIONS

This application is a Division of application Ser. No. 09/376,684 filed Aug. 18, 1999, now U.S. Pat. No. 6,168,720 which application is a continuation-in-part of application Ser. No. 08/879,448 filed Jun. 20, 1997, now U.S. Pat. No. 6,020,281, the contents of which are hereby incorporated by reference.

FIELD OF THE INVENTION

The present invention relates in general to the removal of water from refrigerant mixtures containing difluoromethane (R-32) and relates more particularly to the treatment of such mixtures employed as circulating refrigerant streams of refrigeration systems to sequester water as a means for avoiding freeze-ups and corrosion. The treatment comprises adsorption of these impurities on a zeolitic molecular sieve.

BACKGROUND OF THE INVENTION

In view of the now, well-established relationship between chlorofluorocarbons (CFC's) released into the atmosphere and the depletion of the earth's ozone layer, considerable attention is being directed to finding effective substitutes for these once widely used compounds. It appears that the worst offenders are the fully halogenated CFC's which contain chlorine. These compounds are relatively unreactive with other compounds in the lower atmosphere and thus are able to diffuse into the stratosphere intact and be decomposed by ultraviolet radiation to form inter alia, chlorine-free radicals which readily react with ozone. On the premise that it is the chlorine constituent of the CFC's which ultimately reacts with and destroys the ozone molecules and in the interest of approximating as closely as possible the physical properties of the CFC's already in use, the proposed substitutes in general have been HCFC's containing lesser proportions of chlorine or fluorocarbons containing no chlorine at all. For example, dichlorodifluoromethane, widely used under the trademark Freon 12 as a refrigerant in household refrigerators, in automotive units and in commercial freezers and display cases, has been replaced in many instances by 1,1,1,2-tetrafluoroethane (also known as R-134a) or by chlorodifluoromethane (also known as R-22 or HCFC-22). Because R-134a is not miscible with many commonly used lubricants, mixtures of R-134a and R-22 have been proposed for systems employing lubricants soluble in R-22. See U.S. Pat. No. 5,198,139 (Bierschenk et al.) in this regard. In the recent past, over 90 percent of the chlorodifluoromethane and about a third of the dichlorodifluoromethane manufactured was utilized in air-conditioning and refrigeration.

U.S. Pat. No. 3,536,521 (McKinney et al.) discloses a method of preventing the adsorption of gases other than water, such as fluorinated hydrocarbons, by the coating of Type A zeolite molecular sieves with silicones such as methyl silicone. McKinney et al. further discloses that the fluorinated hydrocarbons used in refrigerant systems react at active sites on the surface of the molecular sieve with subsequent decomposition into halogen acids which react with the basic structure of the molecular sieve.

U.S. Pat. No. 5,514,633 (Noguchi et al.) discloses a method for the production of a desiccant for HFC-32 and blends of HFC-32 which comprises immersing a formed 3A zeolite which has been 20 to 60% ion-exchanged with potassium in an aqueous solution of sodium silicate, potassium silicate, or mixtures thereof to deposit SiO$_2$ on the formed 3A zeolite. The resulting formed 3A zeolite with the SiO$_2$ coating is dehydrated and subsequently activated. U.S. Pat. No. 5,514,633 is hereby incorporated by reference.

U.S. Pat. No. 3,625,866 (Conde) discloses a process for preparing composite desiccant materials for applications such as refrigerant drying wherein the pores of the desiccant are less than about 4.9 angstroms in diameter to permit the inclusion of water molecules and to exclude the larger halogenated hydrocarbon molecules. Conde discloses the use of zeolite 3A which he describes as prepared by replacing at least 65 percent of the sodium cations in zeolite A with potassium cations by conventional cation exchange techniques to adsorb molecules having critical diameters up to 3 angstrom units. Conde hardens the zeolite A into an agglomerate optionally with clay, silicates or both and then applies to the surface of the agglomerate a thin coating of diaspore (hydrated alumina) and a clay mineral, wherein the diaspore is the major component. The coated agglomerate is then soaked in an aqueous solution of potassium silicate to impregnate silicate into the agglomerate, dried in air to avoid steaming during calcination, and finally fired to set the binder and activate the molecular sieve. The refrigerant decomposition tests were based on R-22. Conde discloses that clays which may be employed for bonding molecular sieves without substantially altering the adsorptive properties of the molecular sieve are attapulgite, kaolin, sepiolite, palygorskite, kaolinite, plastic ball clays, clays of the attapulgite or kaolin types, bentonite, montmorillonite, illite, chlorite, and bentonite-type clay.

U.S. Pat. No. 5,347,822 (Cannan et al.) discloses the use of a microporous zeolite molecular sieve having the crystal structure of zeolite B and a framework silica-to-alumina molar ratio of at least 2.5 for use in refrigeration systems containing R-32. Cannan et al. discloses that the modified form of zeolite B has pore openings small enough to significantly limit the adsorption of R-32 while retaining a large capacity for water adsorption.

With increasing recognition of the seriousness of atmospheric ozone depletion, stricter limitations on the future use of any chlorine-containing refrigerant continue to be imposed. One of the most suitable replacements for R-22 in stationary refrigeration systems is a non-flammable mixture of the HFC compound difluoromethane, also known as R-32, with other halocarbons or halohydrocarbons such as R-134a and R-125 (C$_2$HF$_5$). One such mixture known as R-410a has been proposed and consists of 50 percent R-32 and 50 percent R-125. Another proposed mixture (R-407c) consists of 23 percent R-32, 25 percent R-125, and 52 percent R-134a. A significant problem in making this substitution arises from the fact that R-32 is more readily adsorbed than R-22 with zeolite A, commonly employed as an adsorbent-desiccant in the circulating refrigerant stream to protect against freeze-ups and corrosion of the refrigeration unit. Ideally, a purified and dried refrigerant fluid, after having been sealed in a refrigeration unit, would continue to circulate through the compressors, Joule-Thompson nozzles, cooling coils, etc., for the life of the unit without causing any corrosion or freeze-up problems. In practice, however, the system can rarely be so thoroughly sealed or the components so thoroughly dried before sealing to prevent water and other contaminants from entering the sealed system. These contaminating materials must be removed or sequestered to avoid the development of the aforementioned problems. Conventionally, the contaminants are rendered innocuous by adsorption thereof on a suitable adsorbent which is inserted into the sealed system and which is in contact with the circulating refrigerant stream. In the case of halocarbon refrigerants, the contaminants of greatest concern, in addition to water, are attributable to the degradation products of the refrigerant molecules themselves. Halogen acids, notably HCl, can form and cause corrosion. In some instances, the adsorbent composition itself can be a reactant in the chemical reactions which result in the production of corrosive products. Zeolitic molecular sieves generally exhibit this property. Accordingly, in view of the physical and chemical properties of the refrigerant involved, it is necessary to select the particular zeolite adsorbent to minimize harmful reactions. Since essentially all of the active sites of a zeolite are reachable only by molecules which can enter the internal cavities of the crystal structure through its uniform pore system, it is advantageous to employ a zeolite whose pore openings admit water and other small impurity molecules and exclude molecules of the refrigerant. Thus, a commonly used adsorbent for refrigeration systems is a highly exchanged potassium cation form of zeolite A having pore diameters of about 3 angstroms. The effective pore diameters can be further reduced, to a slight degree, by controlled steaming as disclosed in U.S. Pat. No. 3,506,593, hereby incorporated by reference. A potassium cation exchanged (40 percent) form of zeolite A, i.e., zeolite 3A, has been found to be quite effective in drying R-134a and R-22, for example.

R-32, however, is both smaller in molecular size and more polar than R-22 by virtue of the substitution of a hydrogen atom for the chlorine atom in chlorodifluoromethane. It is also more reactive than R-22 with constituents in the lower atmosphere and thus, advantageously, is less likely to escape unreacted into the stratosphere. It is, by the same token, more reactive with zeolites, including zeolite 3A, having pores large enough for R-32 to enter. The greater polarity of R-32 also means that the partial blocking of zeolite pores by cation exchange techniques is less effective in excluding the R-32 from the inner cavities of the zeolite crystal structure. Adsorbent aggregates are sought which minimize reactivity with difluoromethane without reducing the capacity of the adsorbent to adsorb water for use as desiccant in closed-cycle refrigeration systems.

When a molecular sieve adsorbs the refrigerant molecule, there is a much greater chance of chemical interaction between the refrigerant and desiccant, and such interaction will result in the chemical destruction of both. By the term "destruction of both," it is meant that the refrigerant may become decomposed into undesirable products and that the desiccant can lose significant water adsorption capacity. Also, when the refrigerant is adsorbed, it is using up some of the desiccant's capacity for water adsorption. Finally, the composition of a refrigerant blend will be changed if the smaller, more polar refrigerant (like R-32) is selectively adsorbed and removed from the system. All of this is avoided by excluding the refrigerant from the desiccant.

SUMMARY OF THE INVENTION

The desiccant of the present invention, which excludes difluoromethane refrigerant (and lubricants and additives) while adsorbing water, provides the following benefits in refrigeration systems: chemical compatibility with the R-32 refrigerant, high water capacity (greater than about 15 weight percent), and maintenance of refrigerant blend composition.

According to the present invention, in a refrigeration process wherein a refrigerant fluid comprising difluoromethane (R-32) is recycled within a closed system and is alternatively vaporized and condensed in a manner to produce cooling, the improvement comprises incorporating within the closed system containing the difluoromethane and in contact therewith as a desiccant an activated potassium cation form of zeolitic A molecular sieve agglomerated with a clay binder and pore closed, the desiccant having a water adsorption capacity of at least 15 weight percent, essentially no reactivity with difluoroethane and having essentially no capacity for the adsorption of difluoromethane.

DETAILED DESCRIPTION OF THE INVENTION

Zeolitic molecular sieves in the calcined form may be represented by the general formula:

$$Me_{2/n}O:Al_2O_3:xSIO_2:yH_2O$$

where Me is a cation, n is the valence of the cation, x has a value from about 2 to infinity, and y has a value of from about 2 to 10.

Typically, well known zeolites include chabazite (also referred to as zeolite D), clinoptilolite, erionite, faujasite (also referred to as zeolite X and zeolite Y), ferrierite, mordenite, zeolite A, and zeolite P. Detailed descriptions of the above-identified zeolites, as well as others, may be found in D. W. Breck, Zeolite Molecular Sieves, John Wiley and Sons, New York, 1974, hereby incorporated by reference.

The preferred zeolite for use in the present invention is a zeolite A and, more preferably, a zeolite A which has been ion-exchanged with potassium to reduce the pore opening. Preferably, the zeolite A of the present invention has been ion-exchanged with potassium by conventional ion-exchange techniques such as immersing a sodium zeolite A in an aqueous solution of one or more salts of potassium. Such potassium salts include halides, especially the chlorides, nitrates, sulfates, and hydroxides. The aforementioned salts are by no means the only suitable materials and many other salts of potassium normally used in ion-exchange procedures are well known to those skilled in the art.

It is preferred that the zeolite A molecular sieve of the present invention be exchanged with potassium to a high level. Preferably, the potassium exchanged zeolite A of the present invention comprises greater than 40 percent of the available cations replaced with potassium cations. More preferably, the zeolite A of the present invention comprises greater than 60 percent of the available cations exchanged with potassium cations. Most preferably, the zeolite A of the present invention comprises between 60 percent and 80 percent of the available cations exchanged with potassium.

Desiccant compatibility is one of the key areas for testing new refrigerants. A new refrigerant must be compatible with the lubricant, metals, elastomers, motor insulation, and the desiccant used in the system. Desiccant compatibility testing comprises placing desiccant, refrigerant, and often lubricant in a stainless steel vessel for a given time at an elevated temperature. Chemical, physical, and adsorptive properties of the desiccant are determined before and after exposure to the refrigerant. The compatibility of various desiccants can then be ranked according to the magnitude of the changes in these properties. Although changes in all properties have been observed with prolonged exposures of incompatible desiccants to fluorocarbon refrigerants, it was found that fluoride content is the most sensitive indicator of reaction between the desiccant and a fluorocarbon refrigerant. Elevated levels of fluoride (and chloride) detected after short exposure times tend to predict later degradation in other desiccant properties. Therefore, fluoride content is used as a measure of the relative compatibility of various desiccant samples with alternative refrigerants. Lower fluoride content is taken as an indication of lower reactivity and greater compatibility of desiccant with refrigerant.

The compatibility test method consists of several steps. The molecular sieve sample is usually prepared for testing by thermal activation to remove adsorbed water. The activated desiccant sample is loaded into a stainless steel cylinder, the appropriate lubricant is added, a vacuum (<10 mm Hg [<1.3 kPa]) is pulled, and the refrigerant is charged. The cylinder is then aged in an oven at a particular temperature for a particular time. At the end of that time, the cylinder is removed from the oven and cooled. The refrigerant and lubricant are removed from the cylinder and then the molecular sieve is removed. The desiccant sample is then conditioned to prepare it for subsequent analysis of fluoride and chloride content, adsorption properties, and physical properties. The sample is ground to a powder, spread in a thin layer, and exposed to air at ambient conditions for a period of about 48 hours. The sample is then heated in a programmable oven with a nitrogen purge from ambient temperature to about 288° C. to remove volatiles and stabilize the sample. The sample is rehydrated in air at ambient conditions prior to fluoride testing.

It is believed that the fluoride uptake, i.e., the increase in inorganic fluoride content of the desiccant after the compatibility test exposure, is an indication of the reactivity of desiccant with refrigerant. It is believed that the fluoride thus determined had reacted with the aluminosilicate framework of the zeolite molecular sieves to produce silicon and aluminum fluoride salts. In the present invention, it is preferred that the desiccant exhibit essentially no reactivity with the R-32 refrigerant. By the term "essentially no reactivity" with the refrigerant, it is meant that the fluoride uptake, measured according to the above procedure following exposure to the refrigerant at 75° C. (167° F.) for seven days, is less than about 0.1 weight percent, and more preferably, the term "essentially no reactivity" means that the fluoride uptake measured at the above conditions is less than about 0.05 weight percent.

In addition, the desiccant of the present invention has essentially no capacity for the adsorption of R-32. By the term "essentially no capacity" for the adsorption of R-32, it is meant that the refrigerant loading on the adsorbent as measured in McBain-Bakr adsorption apparatus at room temperature and at refrigerant partial pressure of about 66.5 kPa (500 torr) is less than about 0.5/100 gm, and preferably the refrigerant (R-32) loading of the adsorbent is less than about 0.3 g/100 gm. It was found that the adsorbent of the present invention showed essentially no capacity for the adsorption of $CO_2$ at room temperature and a pressure of about 33 kPa (250 torr).

For use as a desiccant-adsorbent in R-32 refrigerant streams, the high potassium exchanged zeolite A crystals are agglomerated into engineered forms to avoid entrainment in the stream and plugging of orifices and conduits and abrasive damage to the refrigeration system. While compaction to create self-bonding of the crystal particles is possible, it is advantageous to utilize binder materials to create agglomerates of high attrition resistance. It has been determined, in this regard, that the choice of binder material and the cation can be important factors in inhibiting the reactivity of the R-32 with the adsorbent agglomerates and contributing to overall compatibility. Sepiolite, bentonite, and attapulgite were found to show greater basicity than halloysite, avery and metakaolin clays. Volclay showed no basicity. For example, clays exhibiting significant degrees of basicity react with R-32 in essentially the same manner as the basic NaA zeolite. Ideally, the clay binder should be neither basic nor acidic and should require modest calcination temperatures to be set. Unfortunately, no commercially available clay has been found to possess all of these properties. Without wanting to be bound by any particular theory, it is possible that R-32 reacts with basic zeolitic aluminosilicates, such as zeolite NaA, according to the following equations:

Dealumination

Presumably, similar reactions occur between $CH_2F_2$ and the various clay compositions commonly used as binder material. These reactions do not, however, occur with equal facility among the various clays. For example, in an experimental procedure wherein liquid $CH_2F_2$ was contacted with a sample of avery clay [ideal formula $Al_2(Si_2O_5)(OH)_4$] and a sample of attapulgite clay [ideal formula $Mg_5Si_8O_{20}(OH)_2 \cdot 8H_2O$] at 75° C. and the vapor pressure of R-32 at that temperature (~53 atmospheres) for 7 days, post-treatment analysis of the avery clay indicated a 0.67 weight percent fluoride content versus a 1.23 weight percent fluoride content for the attapulgite. Sepiolite and halloysite appear to resemble attapulgite and avery clay, respectively, in their reactivity toward $CH_2F_2$. The firing temperatures necessary to achieve adequate bonding exceed 550° C. for halloysite and avery clays. Preferably, the clay binder of the present invention is selected from the group consisting of attapulgite, kaolin, volclay, sepiolite, halloysite, palygorskite, ball clays, bentonite, montmorillonite, illite, and chlorite clays. More preferably, the clay binder of the present invention is selected from the group consisting of attapulgite, kaolin, volclay, sepiolite, and halloysite clays. Sepiolite and attapulgite are from the palygorskite family of clays; whereas bentonite and volclay are montmorillonites; and the halloysites and kaolin are kaolinites.

The preferred desiccant of the present invention comprises a high potassium exchanged 3A zeolite and at least 20 percent clay binder. The solid adsorbent and binder may be mixed in the slurry in a variety of proportions, whether as segregated or agglomerated particles, although it is generally desirable to use only as much binder as is required to give sufficient strength to the coated surface. It is preferred that the adsorbent portion comprises about 70 to 95 weight percent of the total weight of solids, i.e, adsorbent and binder, in the slurry and that the remaining 5 to 30 weight percent comprises binder. In addition to the adsorbent and binder, the slurry may contain a dispersing agent or surfactant to aid in suspending the particles or vary the viscosity of the slurry. Suitable surfactants include for example, a condensed tannin; Dispex, a salt of a polymeric carboxylic acid available from Allied Colloids, Suffolk, Va.; and TSPP, a tetrasodium pyrophosphate available from Monsanto, St. Louis, Mo. When a surfactant or dispersing agent is used, it is preferred that its concentration be in the range of about 0.5 to 5.0 weight percent of the solids content of the slurry.

The zeolite of required chemical composition having been thus attained, it is an essential step that the zeolite crystals and binder as a desiccant agglomerate be contacted with water vapor at an elevated temperature for a time sufficient to reduce its adsorptive capacity for R-32 to essentially no capacity for adsorption of R-32. Preferably the desiccant agglomerate of the present invention is pore-closed to reduce the adsorption of R-32 by contacting the agglomerate in the presence of steam or water vapor at a temperature greater than about 550° C., more preferably the desiccant agglomerate is pore closed in the presence of water vapor at a temperature greater than about 600° C., and most preferably the desiccant agglomerate is pore closed in the presence of water vapor at a temperature between about 600° and about 800° C. A liquid phase R-32 adsorption test was developed to measure adsorption in refrigerant desiccants. The test comprised exposing a 5 g (0.011 lb) sample of activated molecular sieve to 40 g (0.099 lb) of liquid R-32 at 52° C. (125° F.) for a period of about 16 hours in a 75 ml (0.0198 gal) stainless steel cylinder. The cylinder is then cooled to room temperature and the refrigerant is removed and the saturated desiccant is recovered. The saturated desiccant is then analyzed to determine the adsorption of R-32 using a LOI-KF procedure which measures adsorbed water and adsorbed volatiles (VOC) simultaneously. In a combined Loss On Ignition/Karl Fischer (LOI-KF) procedure, an initial weight of about 1 g (0.0022 lb) of the desiccant sample is weighed on an analytical balance in a quartz boat. The sample is inserted at room temperature into a furnace which is purged with dry nitrogen. The furnace is heated to about 950° C. (1742° F.). Any volatiles evolved from the desiccant sample are bubbled through the reaction vessel containing Karl Fischer reagent (a solution of iodine, sulfur dioxide, and pyridine in methanol) of a volumetric Karl Fischer titrator for the determination of water. The water content of the evolved gas is extracted by the methanol in the Karl Fischer reactor vessel and automatically titrated. When the end point of the titration is reached, the furnace is switched off and the sample is allowed to return to about room temperature in the furnace. The final weight of the sample is then determined. The difference between the final and initial weights of the desiccant sample provides the weight Loss On Ignition (LOI), which is a measure of the total volatiles in the sample. The mass of water in the volatiles is proportional to the volume of Karl Fischer reagent used by the titrator. Since the only volatiles on the desiccant are R-32 and water, the adsorption of R-32 is calculated as the difference between the total volatiles (LOI) and the Karl Fischer water content.

Desiccants 3A-6 and 3A-9 are commercial molecular sieves (available from UOP, Des Plaines, Ill.) commonly used in stationary refrigeration facilities. The R-32 liquid adsorptions for 3A-6 and 3A-9 as shown in Table 1 are about 15 g/100 g at 125° F. (52° C.). The desiccant of the present invention effectively excludes R-32 as indicated by its essentially no capacity for R-32 liquid adsorption, the desiccant of the present invention having adsorbed only about 0.2 g/100 g of R-32.

TABLE 1

| Desiccant | R-32 Adsorbed, g/100 g (lb/100 lb) |
|---|---|
| 3A-6 | 15.6 |
| 3A-9 | 14.5 |
| Present Invention | 0.2 |

Although the data in Table 1 was determined for pure R-32, based on these results, the adsorption of R-32 from blends such as R-407 and R-410 series refrigerants containing substantial concentrations of R-32 should similarly be at very, very low levels. Thus, the desiccant of the present invention has essentially no capacity for the adsorption of R-32.

The temperature of the water vapor (steam) and the time of contact between the water and the zeolite depend in large measure on such factors as the crystal size of the zeolite product, the quantity of zeolite charge, and the effectiveness of the contact. Preferably, temperatures in excess of about 550° C. are employed over a period of about 20 to 90 minutes in air at a steam content ranging from about 10 to about 60 mole percent steam. It is more preferred that such steaming take place in a furnace or kiln in an air atmosphere at temperatures ranging from about 600° to about 800° C. In any case, an unduly rapid loss of water with attendant inadequate contact time of water with zeolite should be avoided. For any given physical state and composition of zeolite agglomerate, one skilled in the art can readily determine by periodic measurement when sufficient pore closure has been attained.

According to the present invention, it was discovered that by applying conventional pore-closing techniques, particularly hydrothermal treatment at elevated temperatures, to an engineered agglomerate comprising a highly exchanged potassium form of zeolite A and a select group of clay binders, the resulting modified zeolite A molecular sieve desiccant surprisingly retained a significant capacity for the adsorption of water while essentially excluding the adsorption of difluoromethane. A paper entitled, "Inorganic Fluoride Uptake As A Measure of Relative Compatibility of Molecular Sieve Desiccants with Fluorocarbon Refrigerants," by Alan P. Cohen and C. Scott Blackwell, published in the American Society of Heating, Refrigerating and Air Conditioning Engineers, Inc. Transactions 1995, Volume 101, and presented on Jun. 26, 1995 at the Annual ASHRAE Conference in San Diego, Calif. discloses a desiccant compatibility test for measuring the reactivity of zeolite desiccants and R-32 refrigerants. The above article is hereby incorporated by reference. Surprisingly, similar compatibility tests carried out on the desiccant of the present invention indicated that even though the new desiccant was made from a zeolite A base, the reactivity of the new desiccant with difluoromethane was essentially nil, and the adsorption of fluoride from R-32 was less than about 0.5 weight percent and surprisingly, in some cases, was less than about 0.3 weight percent. It was determined by conventional means that the water adsorption capacity of the desiccant of the present invention was in excess of 15 weight percent

EXAMPLES

The invention will be further clarified by a consideration of the following examples, which are intended to be purely exemplary of the use of the invention.

R-32 Adsorption Procedure Employed In Examples

In order to verify the suitability of the clay bonded potassium exchanged Zeolite 3A adsorbent for use in the present process, refrigerant/desiccant compatibility tests were carried out in which a mixture of liquid R-32 and a polyester lubricant were contacted with the adsorbent in a stainless steel bomb. In carrying out the tests, 10 grams of 1/16" activated pellets of the adsorbent having a water adsorption capacity greater than about 15 weight percent were first added to the bomb followed by the injection of 10 grams of the lubricant and lastly by a charge of 10 grams of the R-32 refrigerant in the liquid phase. Air was evacuated from the bomb after adding lubricant but before charging with refrigerant. The temperature of the sealed bomb was raised to 75° C. and retained in that state for seven days. Thereafter, the adsorbent was recovered and adsorbed R-32 refrigerant was removed from the zeolite pores by first grinding the zeolite particles, permitting the ground solids to hydrate in open air for a period of about 11 days. The residual fluorine content of the hydrated solids was determined as described hereinabove as a measure of the degree which the R-32 reacted with the adsorbent.

Example I

Figure 1:
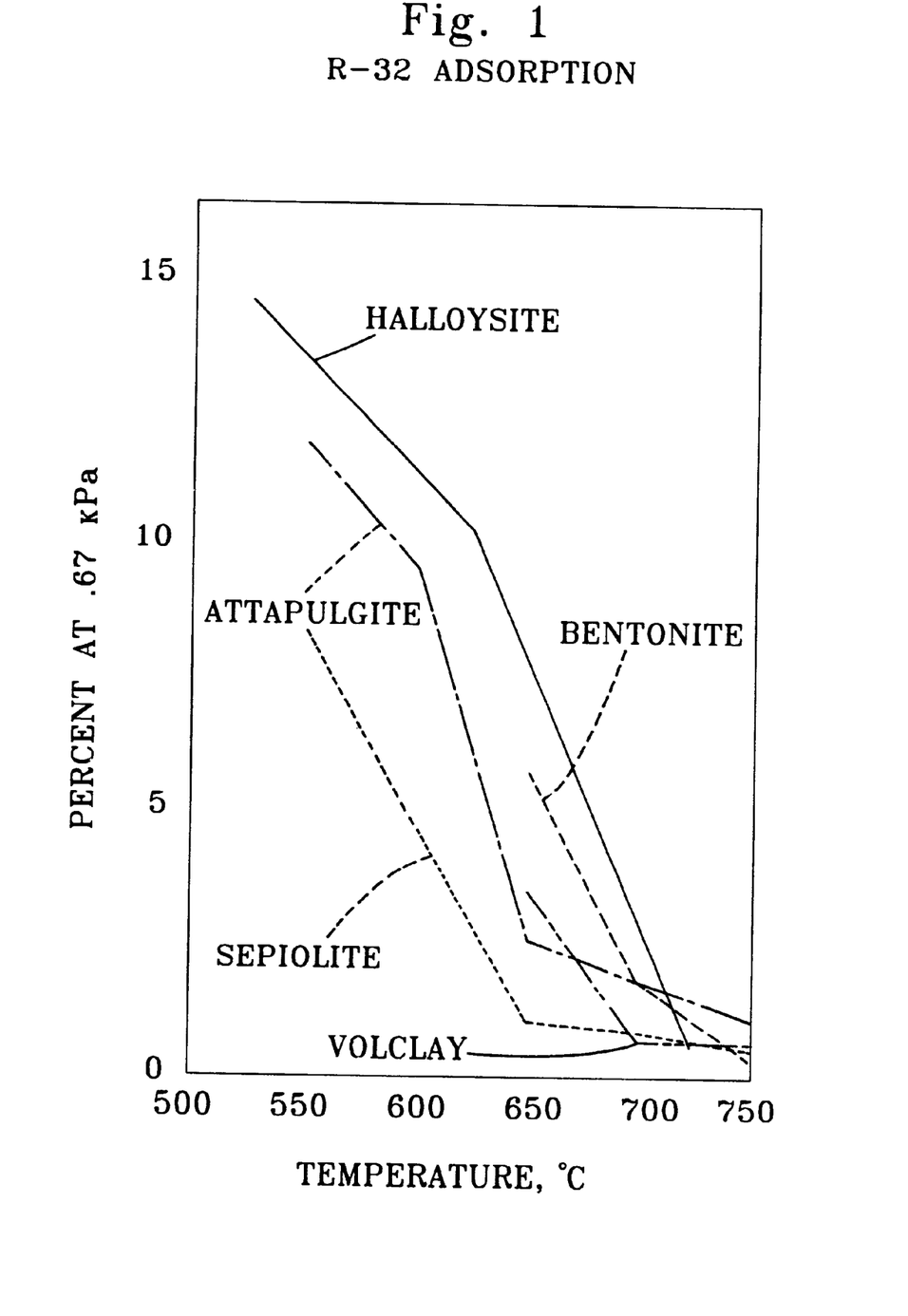
FIG. 1 shows R-32 adsorption at 67 kPa.
Figure 2:
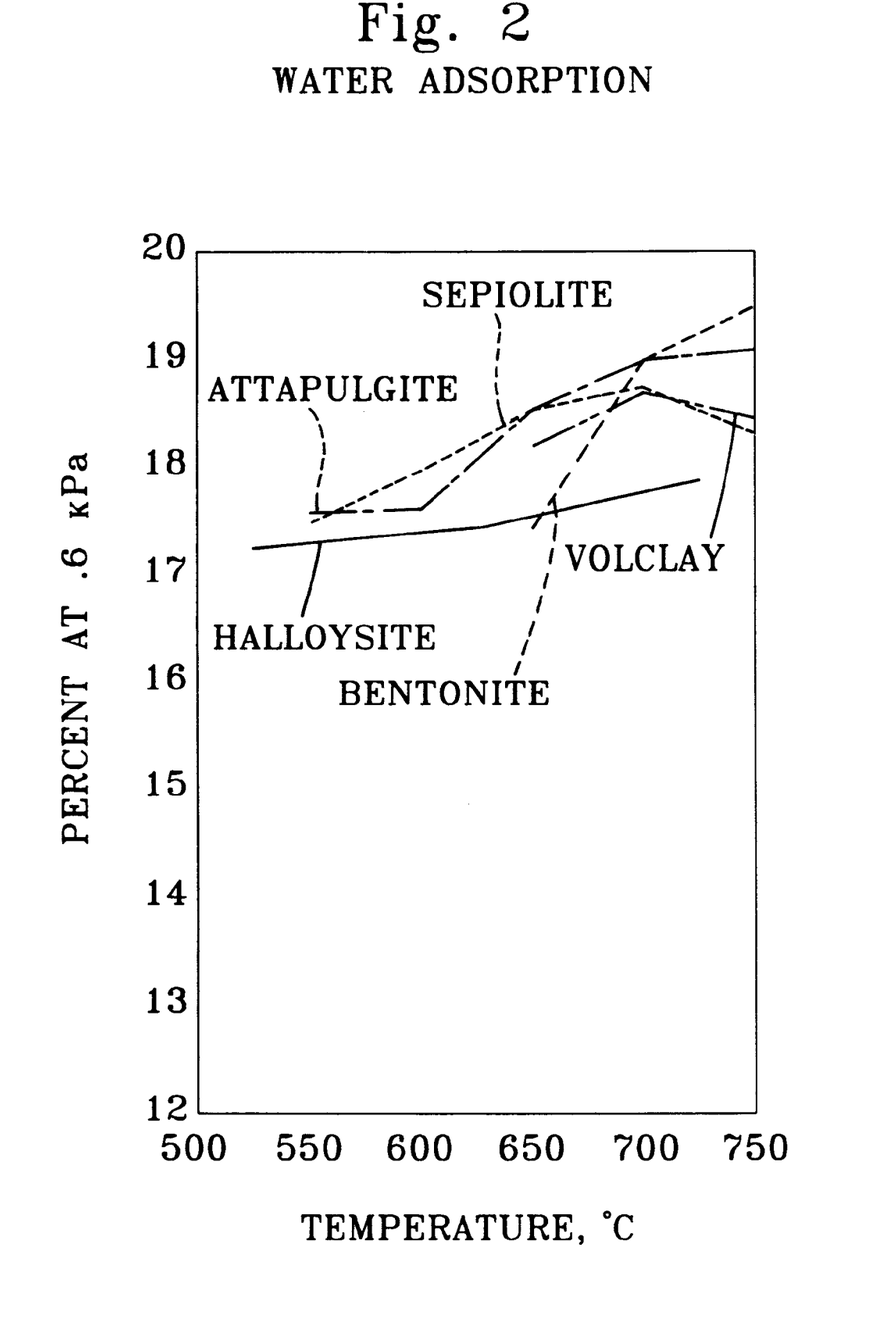
FIG. 2 shows water adsorption at about 0.6 kPa.

A series of samples of clay bonded high potassium (80 percent) exchanged zeolite 3A was prepared with a variety of clay binders. The clay binders included sepiolite, attapulgite, halloysite, halloysite, volclay, and bentonite clay. The zeolite level was 80 percent and the binder level was 20 percent. The samples were formed by mulling the zeolite with the clay in an aqueous medium, extruding the mulled mixture and drying the extrudate at 100° C. to achieve an LOI in the range of about 17.4 to 20.1 weight percent at 1000° C. About 10 grams of each of the clay bonded samples was steam calcined in a horizontal steamer at temperatures ranging from about 500° to about 800° C. while 10 percent steam in air was passed over the sample for about one hour. The R-32 adsorption at about 67 kPa (500 Torr) results are summarized in FIG. 1 and the water adsorption at about 0.6 kPa (4.6 Torr) results are summarized in FIG. 2. The clay bonded zeolite samples of sepiolite at 650° C., volclay at 700° C., halloysite at 725° C. and bentonite at 750° C. had water capacities ranging from 17 to 19.5 weight percent while effectively excluding adsorption of R-32 or reducing the amount of R-32 to about 0.99 percent for sepiolite, 0.67 percent for volclay, 0.55 percent for halloysite, and 0.39 percent for bentonite at the above steam calcination temperatures. The halloysite lost water capacity with increasing steam calcination temperature.

Example II

Figure 3:
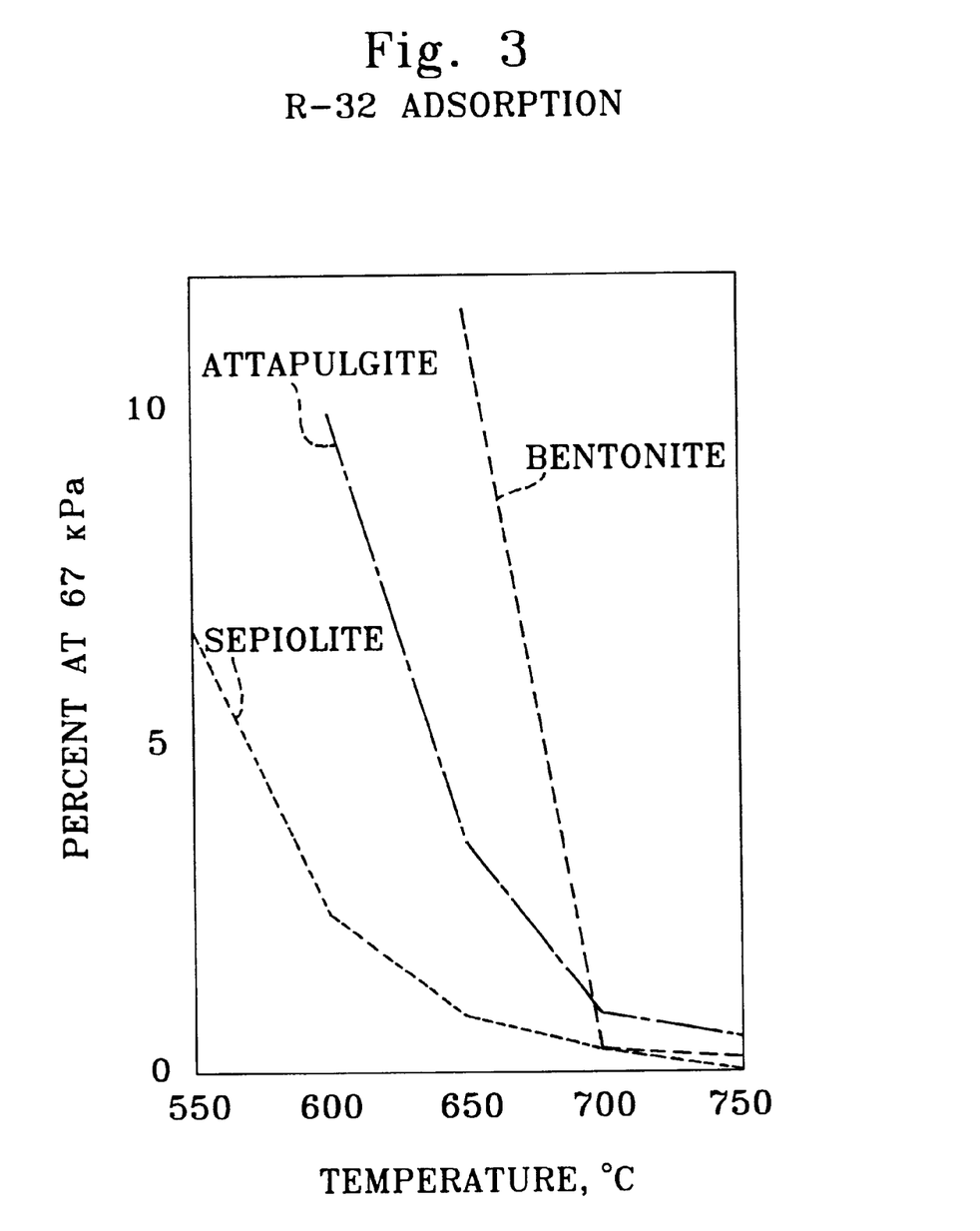
FIG. 3 shows R-32 adsorption as a function of calcination temperature of the desiccant.
Figure 4:
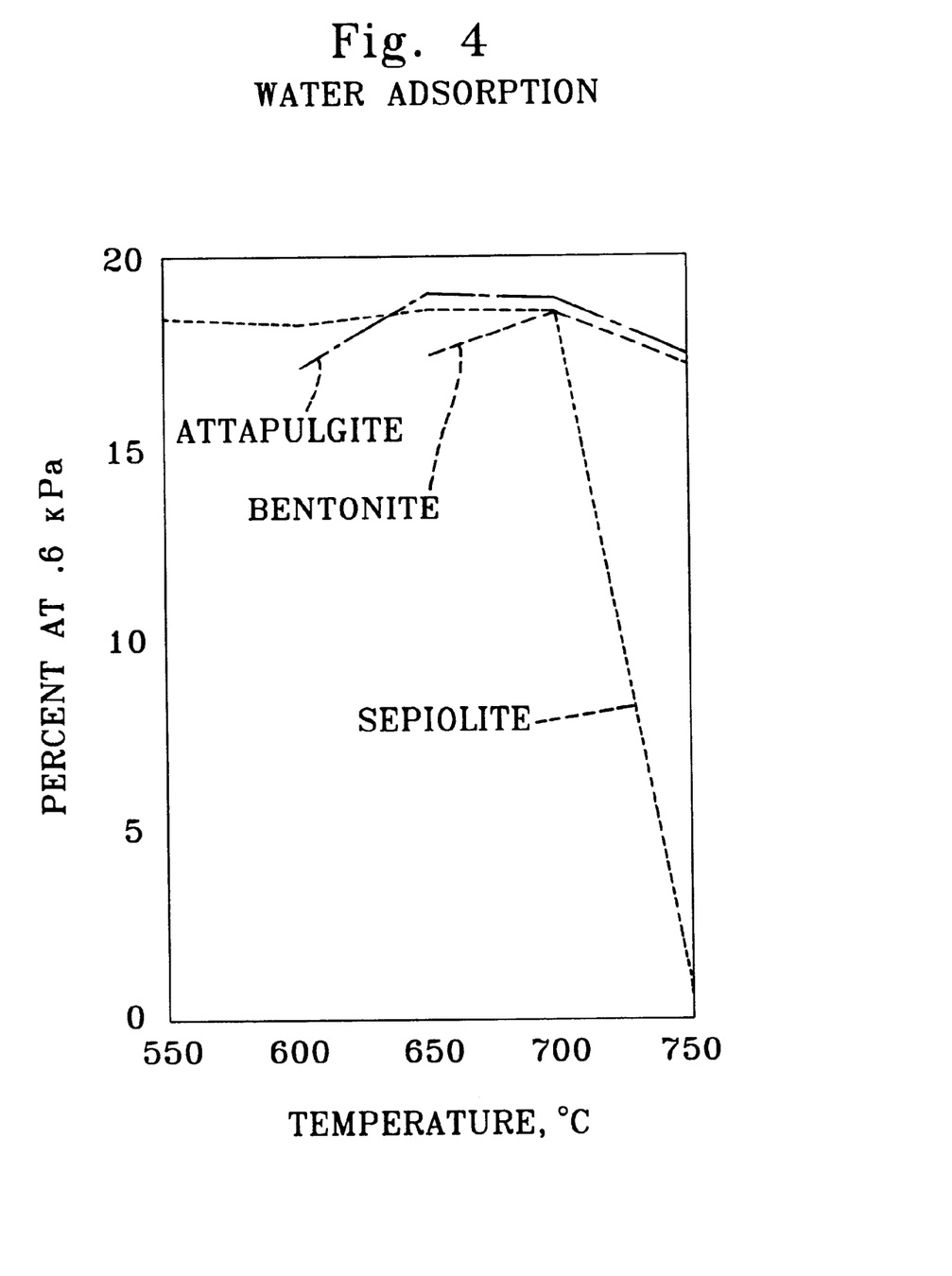
FIG. 4 shows water adsorption as a function of calcination temperature of the desiccant.

A second series of samples of clay bonded 80 percent high potassium exchanged zeolite 3A with 20 percent clay binder was prepared in the manner of Example I in 500 gram quantities for sepiolite, attapulgite, and bentonite clays. The samples were calcined over a range of temperatures from about 550° to about 750° C. using 20 mole percent steam in air for about 1 hour. The R-32 and water adsorption results as a function of calcination temperature are shown in FIGS. 3 and 4. Although the adsorption of R-32 was reduced with increasing hydrothermal treatment, the sepiolite and attapulgite materials lost water capacity.

Example III

A 500-gram sample of halloysite clay bonded high potassium exchanged 3A zeolite prepared according to the manner of Example I was hydrothermally treated at 625° C. and 725° C. with 10 mole percent steam in air in a vertical steamer for about 1 hour. Unexpectedly, the halloysite-bonded material exhibited the following adsorption results:

| Temp., ° C. | R-32, wt-% | Water, wt-% |
|---|---|---|
| 625 | 2.55 | 17.27 |
| 725 | 0.2 | 13.80 |

Example IV

A 500-gram sample of a volclay bonded high potassium exchanged 3A zeolite prepared according to the manner of Example II was hydrothermally treated with about 10 mole percent and 15 mole percent steam in air at about 650° C. and about 700° C. for about 1 hour. The volclay-bonded material showed very low adsorption of R-32 and consistent water capacity as shown below:

| Temp., ° C. | Steam, wt-% | R-32, wt-% | Water, wt-% |
|---|---|---|---|
| 650 | 10 | 0 | 17.96 |
| 650 | 15 | 0 | 17.93 |
| 700 | 10 | 0.35 | 18.56 |
| 700 | 15 | 0 | 18.48 |

Example V

A potassium exchanged zeolite A (77 parts), having greater than about 60 percent of the available cations exchanged with potassium, was combined with a clay binder comprising Koalin clay (18 parts), Halloysite clay (5 parts) and a dispersant (0.5 parts) and finely pulverized with a vibrating ball mill and thereto was added water (as an aqueous medium, 31 parts) and the mixture was well kneaded with agitation with a kneader to give a potassium exchanged zeolite A composition. The composition thus obtained was charged to a mixer agglomerator to form green beads. The green beads were screened to obtain 6×10 beads. The 6×10 beads were air dried for about two days at a temperature of about 120° C., and thereafter the 6×10 beads were charged to a rotary kiln with the kiln operating at a calcination temperature ranging from about 550° to about 800° C., in the presence of steam. The steam was introduced at a rate equal to about 40 mole percent of the air rate. Following calcination, the 6×10 bead product was cooled.

The product thus obtained had the following properties:

| | |
|---|---|
| 1000° C. LOI | 1.17 |
| Bulk Density | 56.0 |
| Piece Density | 1.43 |
| Crush Strength | 15.4 |
| R-32 Adsorption | 0.35 wt-% |
| Water Adsorption | 18.4 wt-% |

Example VI

A sample of the potassium exchanged zeolite A desiccant of the present invention was compared to desiccants of the prior art which employed silicate treatment to achieve a reduction in the adsorption of difluoromethane while maintaining a reasonable water adsorption capacity. The samples included in this analysis of the desiccant surface were: A-a silicate coated 2 mm bead prepared according to U.S. Pat. No. 5,514,633, B-a silicate coated 2 mm bead consistent with the method disclosed in U.S. Pat. No. 3,625,866 (W. R. Grace, Baltimore, Md.), and C-a 2 mm bead of the present invention. The following table summarizes the results of an analysis of the surface of the particle by photoelectron spectra. Photoelectron spectra were obtained on a Physical Electronics Quantum 2000 Scanning ESCA Microprobe spectrophotometer (available from Physical Electronics, Inc. of Eden Prairie, Minn.) using a monochromatic aluminum K-alpha x-ray source (1486.6 eV) and standard procedures familiar to those versed in the art. As is well known to those versed in the art, the method of XPS is sensitive only to roughly the first 50 angstrom units of the samples and thus only measures surface concentrations of elements.

| Desiccant | A | B | C |
| --- | --- | --- | --- |
| R-32 Adsorption, wt-%, 16 hr @ 52° C. | 5.5 | 0.4 | 1.3 |
| Aluminum, mol-% | 9.03 | 6.56 | 11.48 |
| Silicon, mol-% | 15.60 | 15.58 | 13.53 |
| Surface Si/Al, mol/mol | 1.73 | 2.38 | 1.18 |

The results of the XPS analysis clearly show that the desiccant C of the present invention has essentially no adsorption capacity for difluoromethane and has a surface ratio of silicon to aluminum at the surface of the particle which is less than about 1.7 mol/mol. Desiccants A and B which were coated to reduce the tendency of the zeolite to adsorb the difluoromethane were shown to have significantly higher surface ratio of silicon to aluminum as determined by X-ray photoelectron spectroscopy. The term "essentially no capacity for the adsorption of difluoromethane" as used herein means that preferably, the adsorption capacity for difluoromethane is less than about 1.2 weight percent, more preferably the adsorption capacity for difluoromethane is less than about 1.0 weight percent, and most preferably the adsorption capacity for difluoromethane is less than about 0.5 weight percent.

We claim:

1. A desiccant for use with a refrigerant comprising difluoromethane, said desiccant comprising a potassium exchanged zeolite A having greater than about 60 percent of available cations exchanged with potassium and a clay binder, said desiccant having a water adsorption capacity greater than about 15 weight percent, having essentially no difluoromethane adsorption capacity, and having a surface ratio of silicon to aluminum of less than about 1.7 mol/mol as determined by X-ray photoelectron spectroscopy.

2. The desiccant of claim 1 wherein the difluoromethane adsorption capacity is less than about 1.2 weight percent.

3. The desiccant of claim 1 wherein the difluoromethane adsorption capacity is less than about 1.0 weight percent.

4. The desiccant of claim 1 wherein the difluoromethane adsorption capacity is less than about 0.5 weight percent.

* * * * *